United States Patent
Boley et al.

(10) Patent No.: US 11,402,547 B2
(45) Date of Patent: Aug. 2, 2022

(54) METHODS OF FORMING PARTICULATE FILMS AND FILMS AND DEVICES MADE THEREFROM

(71) Applicant: Purdue Research Foundation, West Lafayette, IN (US)

(72) Inventors: John William Boley, Cambridge, MA (US); Rebecca Kramer Bottiglio, Hamden, CT (US)

(73) Assignee: Purdue Research Foundation, West Lafayette, IN (US)

( * ) Notice: Subject to any disclaimer, the term of this patent is extended or adjusted under 35 U.S.C. 154(b) by 41 days.

(21) Appl. No.: 17/017,625

(22) Filed: Sep. 10, 2020

(65) Prior Publication Data

US 2020/0408958 A1   Dec. 31, 2020

Related U.S. Application Data

(62) Division of application No. 15/429,238, filed on Feb. 10, 2017, now Pat. No. 10,775,533.

(60) Provisional application No. 62/294,659, filed on Feb. 12, 2016.

(51) Int. Cl.
| | |
|---|---|
| *G02B 1/12* | (2006.01) |
| *G02B 5/20* | (2006.01) |
| *G02B 27/14* | (2006.01) |
| *B05D 7/24* | (2006.01) |

(52) U.S. Cl.
CPC ............. *G02B 1/12* (2013.01); *G02B 5/205* (2013.01); *G02B 27/142* (2013.01); *B05D 7/24* (2013.01); *B05D 2401/32* (2013.01)

(58) Field of Classification Search
CPC . G02B 1/10; G02B 1/12; G02B 5/205; G02B 27/142; B05D 7/24; B05D 2401/32
USPC ........................................................ 359/839
See application file for complete search history.

(56) References Cited

U.S. PATENT DOCUMENTS

| | | | | |
|---|---|---|---|---|
| 3,719,526 A | * | 3/1973 | Zito, Jr. | H01M 4/00 429/199 |
| 4,679,918 A | * | 7/1987 | Ace | G02C 7/02 351/159.62 |
| 5,415,753 A | * | 5/1995 | Hurwitt | C23C 14/0068 204/192.12 |
| 5,478,634 A | * | 12/1995 | Setoyama | C03C 17/3435 428/212 |

(Continued)

*Primary Examiner* — Ricky D Shafer
(74) *Attorney, Agent, or Firm* — Purdue Research Foundation

(57) ABSTRACT

A method of depositing a film comprising a monolayer of particles. The method includes providing a dispersion comprising particles and at least two liquids and depositing drops of the dispersion onto a substrate and evaporating the at least two liquids resulting in a film of a monolayer of the particles. One embodiment of the method includes a coating on the outer surface of particles such that the coating makes the particles substantially non-dispersible, substantially non-soluble and substantially non-suspendable in one of the liquids. A particulate film containing at least one layer of particles, wherein the at least one layer is substantially made of particles of a chemical composition and has uniform thickness. Optical devices containing a particulate film containing at least one layer of particles, wherein the at least one layer is substantially made of particles of a chemical composition and has uniform thickness.

2 Claims, 17 Drawing Sheets

(56) References Cited

U.S. PATENT DOCUMENTS

| | | | |
|---|---|---|---|
| 6,509,270 B1* | 1/2003 | Held | H01L 21/31053 |
| | | | 257/E21.244 |
| 9,841,327 B2* | 12/2017 | Bottiglio | G01L 1/005 |
| 10,775,533 B2* | 9/2020 | Boley | G02B 1/12 |
| 2002/0027626 A1* | 3/2002 | Hiraishi | G02F 1/133504 |
| | | | 349/112 |
| 2003/0140851 A1* | 7/2003 | Janakiraman | C23C 16/45565 |
| | | | 118/715 |
| 2004/0066556 A1* | 4/2004 | Dontula | G03B 21/62 |
| | | | 359/599 |
| 2006/0028722 A1* | 2/2006 | Miyata | G03B 21/625 |
| | | | 359/460 |
| 2014/0106146 A1* | 4/2014 | Decker | C03C 17/3435 |
| | | | 428/210 |
| 2015/0168742 A1* | 6/2015 | Hoshino | G02C 7/00 |
| | | | 351/159.57 |

* cited by examiner

METHODS OF FORMING PARTICULATE FILMS AND FILMS AND DEVICES MADE THEREFROM

CROSS-REFERENCE TO RELATED APPLICATIONS

The present U.S. patent application is a divisional of U.S. patent application Ser. No. 15/429,238 filed Feb. 10, 2017, which is related to and claims the priority benefit of U.S. Provisional Patent Application Ser. No. 62/294,659 filed Feb. 12, 2016, the contents of which are hereby incorporated by reference in their entirety into the present disclosure.

TECHNICAL FIELD

This disclosure relates to methods of forming particulate films including monolayer films. This disclosure also relates to devices made from such particulate films.

BACKGROUND

This section introduces aspects that may help facilitate a better understanding of the disclosure. Accordingly, these statements are to be read in this light and are not to be understood as admissions about what is or is not prior art.

There are many industrial applications such as but not limited optoelectronics, electronic devices, sensors, and photovoltaic applications where uniform films of particles is required. By uniform, we mean uniform thickness such that variations across a particulate film are of the order of magnitude of the size of the particles comprising the film. Techniques used for this in the industry include Langmuir transfer techniques which is a vacuum-based technique. Other methods include chemical vapor deposition (CVD) and physical vapor deposition, which require complex equipment and have higher energy cost.

Thus, there exists a need for techniques for forming uniform films of particles that require no vacuum and no transfer techniques and are capable of forming films directly onto a desired substrate without the need for complex equipment and high energy cost.

SUMMARY

A method of forming a film comprising a monolayer of particles is disclosed. The method includes providing a dispersion comprising particles and at least two liquids, depositing drops of the dispersion onto a substrate, and evaporating the at least two liquids, wherein complete evaporation of the at least two liquids results in formation a film comprising a monolayer of the particles.

A method of forming a film comprising particles is disclosed. The method includes providing particles with a coating on their outer surface such that the coating makes the particles substantially non-dispersible, substantially non-soluble and substantially non-suspendable in a first liquid, but are substantially soluble and dispersible in a second liquid, wherein the first liquid and the second liquid are miscible and the evaporation rate of the second liquid is greater than the evaporation rate of the first liquid; dispersing the particles into the second liquid and mixing the resulting mixture with the first liquid to form a process mixture; depositing the process mixture onto a substrate; and evaporating the first liquid and second liquid to form a film comprising the particles on the substrate.

A particulate film containing at least one layer of particles is disclosed. The at least one layer of the particular film is substantially made of particles of a chemical composition and has uniform thickness.

An optical device which includes a particulate film containing at least one layer of particles is disclosed. The at least one layer of the particulate film of the optical device is substantially made of particles of a chemical composition and has uniform thickness.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting.

DETAILED DESCRIPTION

Figure 1A:
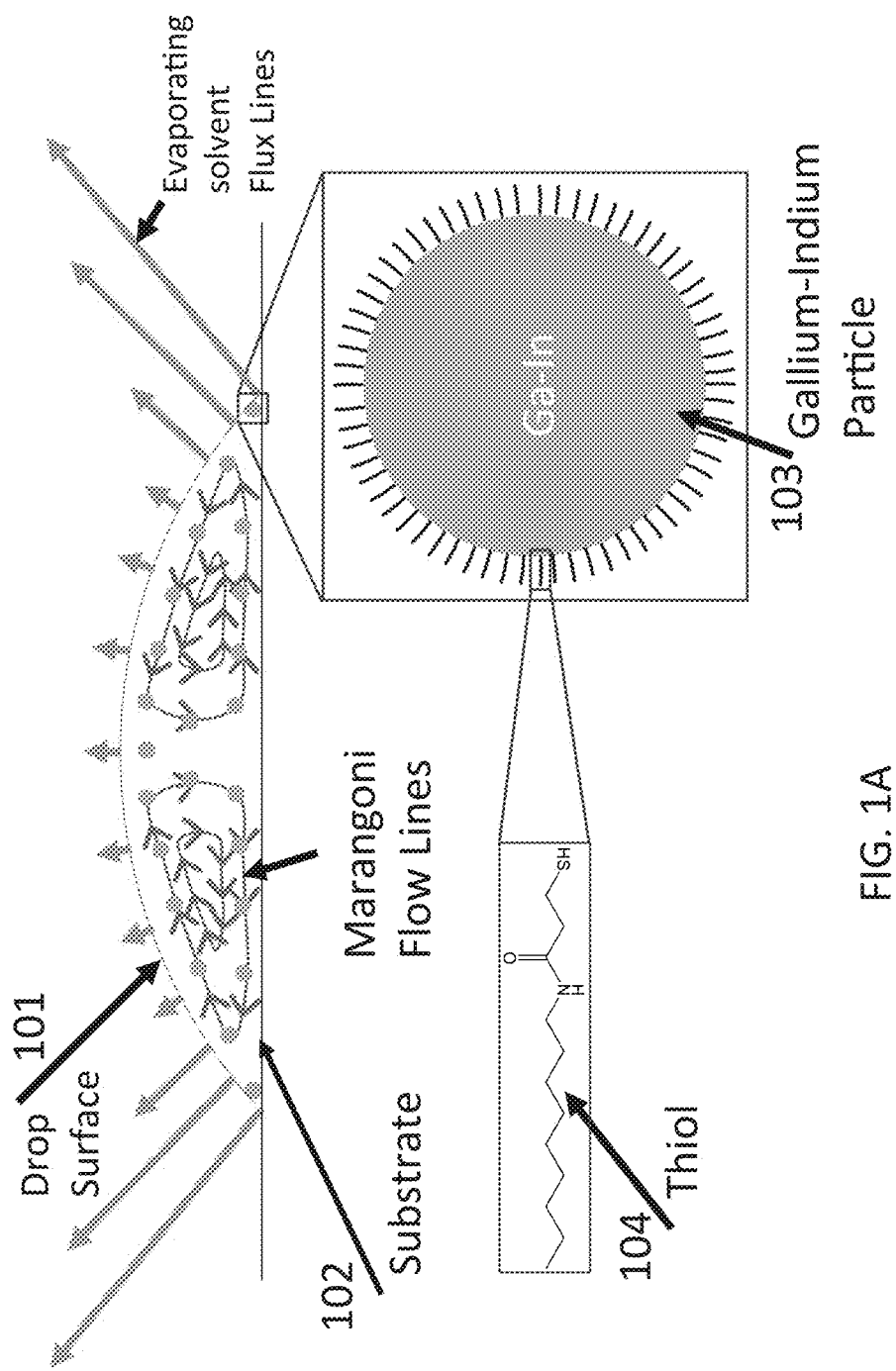
FIG. 1A is a schematic representation of a drop of an evaporating dispersion containing thiol-capped Ga—In particles in an ethanol/water dual-solvent mixture.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended.

Particles can be dissolved or suspended in a liquid. In many instances, the particles can dissolve to certain degree in the liquid, which we can call a solvent. In this disclosure, for simplicity, we use liquid and solvent interchangeably while recognizing that solubility of a particular material in a particular liquid is near-zero or negligible. In several instances in addition to dissolved particles there can be suspended particles either because dissolution limit has been reached or the conditions are not favorable for further dissolution or both. In such a case, the undissolved particles are dispersed in the solvent. For purposes of this disclosure such solvent+particle mixtures are termed as dispersions.

From such dispersions, as a drop of liquid evaporates on a solid surface, the particles within form a film. Due to the myriad physical and chemical processes involved during evaporation, the structure of this film can vary greatly, ranging from simple ring formations like those seen in coffee drops to more complex morphologies such as fractal patterns. Of these possible outcomes, a strikingly uniform film results by using dispersions with multiple solvents. These films also show great potential for industrial applications, as they may provide simpler, faster, and less costly ways to manufacture thin film devices compared to conventional methods. By appropriately tuning design parameters, multiple-solvent based films could also be used to produce conformal monolayer coatings on three dimensional surfaces or extremely fine hole patterns. Here we ascribe the uniform films associated with dispersions containing multiple solvents to a hybrid self-assembly process.

The methods, films and devices of this disclosure are further illustrated with a non-limiting example of a two-solvent dispersion. In this disclosure such a dispersion is also called mixture or suspension. A drop from the two-solvent dispersion segregates during evaporation, resulting in an elevated concentration of higher vapor pressure solvent at the drop surface. Consequently the particles, miscible only in the higher vapor pressure solvent, are carried toward the drop surface. Once at the drop surface, the particles self-assemble due to attractive particle-interface interactions. Real-time observations during evaporation reveal the mechanisms of this self-assembly process. The observed drop profile kinetics agree well with an evaporation model for drops of dual-solvent dispersions developed in work leading to this disclosure. In experiments leading to this disclosure it has been demonstrated that film uniformity depends on an optimal initial particle concentration, below which voids result and above which exhibits a coffee ring formation occurs. This technique, as later described in this detailed description, has been is used in experiments leading to this disclosure to produce thin film devices such as flexible broadband neutral density filters and semi-transparent mirrors. This hybrid self-assembly approach requires no particle-substrate interactions, is scalable, robust, and transferrable. This disclosure describes methods of uniform films based on dispersions containing two or more solvents and demonstrates applications for drop-based fabrication of thin film devices.

For purposes of this disclosure, the following nomenclature is employed. The word particles has its usual meaning. This disclosure refers to particles in at least three different stages in the methods and embodiments of this disclosure: particles prior to dissolving or dispersing in a solvent; particles dissolved or dispersed in a solvent or particles just added to a liquid; and particles that are constituents of a film made by the methods of this disclosure. The term 'deposit" is used for a drop or collection of drops of dispersion deposited on a substrate. When the liquid content of the deposit evaporates leaving behind a collection of particles, this collection of particles is called a film, for purposes of this disclosure.

This disclosure describes, as an example of utilizing a dispersion containing more than one solvent, a process that is applicable to any two-solvent system where the dispersed particles (or non-volatile material, in general) are miscible only in the solvent with a higher vapor pressure. For purposes of this disclosure, a mixture of two solvents for the particles is called a dual-solvent mixture. Illustratively, ethanol and water form a dual-solvent mixture for use with thiol-capped Ga—In particles. Several aspects of this disclosure will now be described in terms of this system through the use of FIGS. 1A through 1D. FIG. 1A is a schematic representation of a drop 101 of a dispersion containing thiol-capped eutectic Ga—In particles in an ethanol/water dual-solvent system placed on a substrate 102. Referring again to FIG. 1A, 103 is a schematic representation of thiol-capped Ga—In single nanoparticle covered with a self-assembled monolayer of thiol. Thiol is shown as strands emanating from the Ga—In particle and its molecular structure is schematically represented as 104 in FIG. 1A. The arrows shown emanating from the surface of the drop 101 indicate the direction and magnitude of the flux of an evaporating solvent in the dispersion. For illustrative purposes the arrows represent the flux of one of the solvents. A similar set of arrows can be drawn for the other solvent (or solvents in case of a multi-solvent dispersion) in the dual-solvent dispersion. In experiments leading to this disclosure, polydimethylsiloxane (PDMS) substrates were used to demonstrate the self-assembly process but the process is applicable to any substrate on which there is contact line pinning throughput evaporation. Single-solvent (ethanol only) drops exhibited various particle size-dependent structures, including distributed clumps for large particles (268±51 nm), highly pronounced coffee rings for medium particles (110±22 nm), or less pronounced outer coffee rings with interior fractal-like films for small particles (84±18 nm). It should be noted that fractal patterns were observed at the contact line for single-drops containing all particle sizes. With the inclusion of a lower vapor pressure solvent (water in this case), the resulting film structures became strikingly uniform, ranging from thick, in the cases where the contact line becomes de-pinned early during the evaporation process, to extremely thin, when the contact line remains pinned throughout evaporation. This disclosure mainly addresses the latter case of an extremely thin monolayer.

Figure 1B:
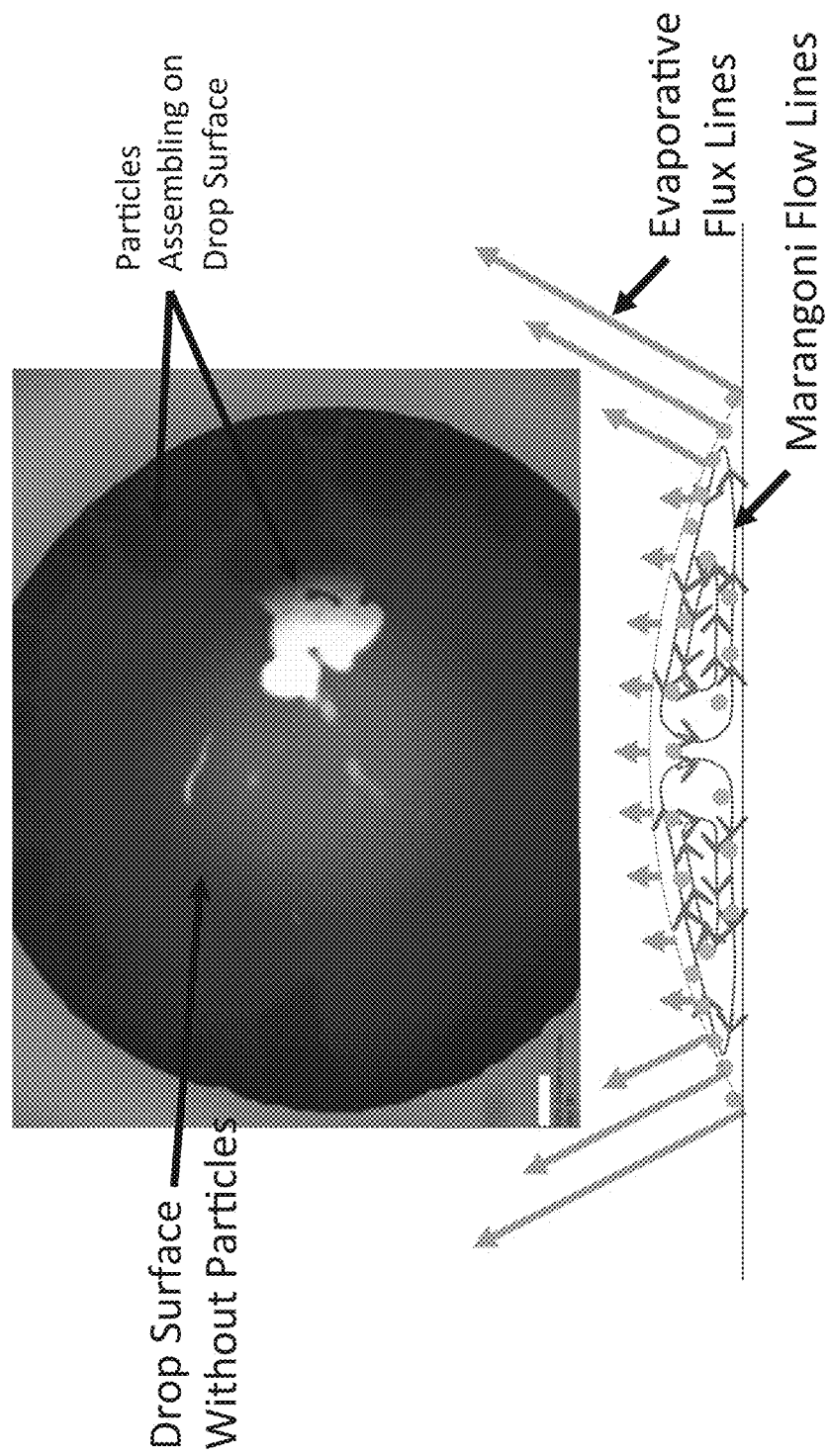
FIG. 1B shows an image of the drop from the suspension as described above at an early stage of evaporation (<10% of evaporation time).

FIG. 1B shows an image of the drop from the suspension as described above at an early stage of evaporation (<10% of evaporation time). For purposes of this disclosure, evaporation time is the total amount of time taken for all of the solvents to leave the drop. Referring to the sketch in FIG. 1B, it can be seen that assembly begins at the onset of evaporation when a ring of nanoparticles nucleates at the contact line, where the flux of solvent leaving the drop is the highest. This is because particles within evaporating drops tend toward the surface where evaporation flux is the highest. In the sketch in FIG. 2B, the arrows have the same meaning as in FIG. 1A. Following nucleation, rather than further accumulation of nanoparticles at the boundary to form a previously observed coffee ring, the structure transitions into a uniform sheet over the surface of the drop as the surface area is reduced and more nanoparticles are introduced to the interface. Note that the Marangoni flow within the drop during evaporation recirculates nanoparticles below the surface until they are introduced to the interface. This Marangoni flow is a result of surface tension gradients established by drop cooling effects, as well as nanoparticle concentration gradients at the surface (i.e., the areas of the drop surface that are densely packed with nanoparticles (initially at the contact line) will exhibit a lower surface tension compared to areas that are particle free, resulting in a surface flow from the edge of the drop to its center). The direction of the Marangoni flow can be deduced by considering the influence of gradients in temperature, ethanol concentration, and nanoparticle concentration on surface tension gradients The Marangoni flow may be either thermally driven or concentration driven, where the dominant case dictates the direction of the internal droplet flow. The mismatch in thermal conductivities between the substrate and the liquid indicates a Marangoni flow from the top of the drop to the bottom along the liquid-air interface and from the contact line toward the center of the drop along the liquid-solid interface and a corresponding thermal Marangoni number, MaT=$5.18\times10^3$. On the other hand, given the higher evaporation rate of ethanol compared to water, it is expected that there will be an elevated concentration of ethanol at the contact line where the flux is the highest. Because ethanol also has a lower surface tension, this results in a concentration driven surface tension gradient opposing the thermally driven gradient and a flow opposing the one brought about by thermal gradients. The magnitude of the concentration driven Marangoni number associated with the gradients in ethanol concentration is MaC=$1.53\times10^7$, which is 4 orders of magnitude larger than MaT and therefore dominates the direction of the flow. Moreover, the influence of the nanoparticles can further contribute to this flow in two ways. First, the areas of the drop surface that are densely packed with nanoparticles (initially at the contact line) will exhibit a lower surface tension compared to areas that are particle free resulting in a surface flow from the edge of the drop to its center along the liquid-air interface. Second, the nanoparticles can be viewed effectively as surface contaminants, which can further reduce MaT by as much as 2 orders of magnitude, thus increasing the relative dominance of the concentration driven flow.

Figure 1C:
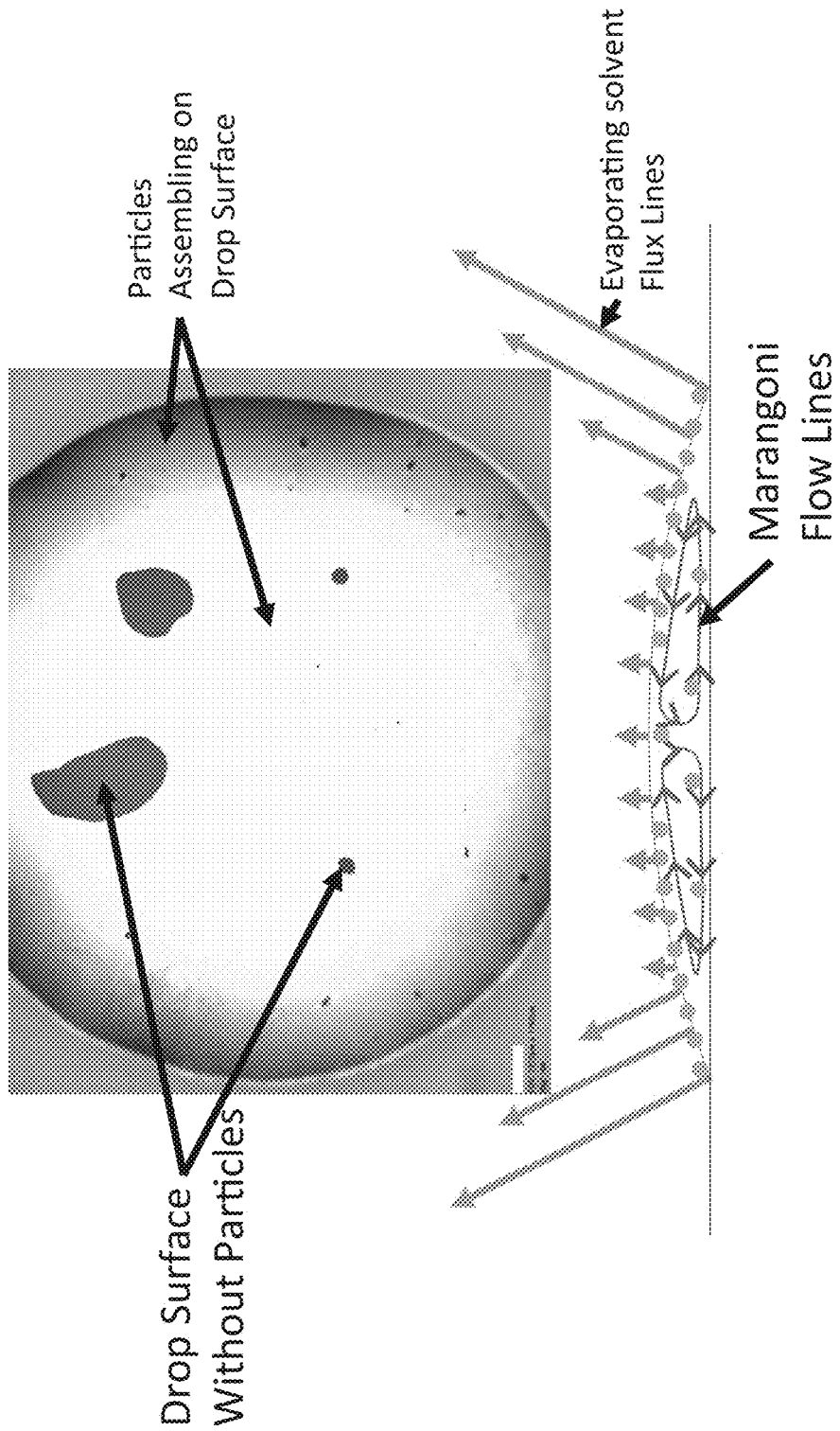
FIG. 1C is in image of the middle stage of evaporation (50% of evaporation time) of the drop.
Figure 1D:
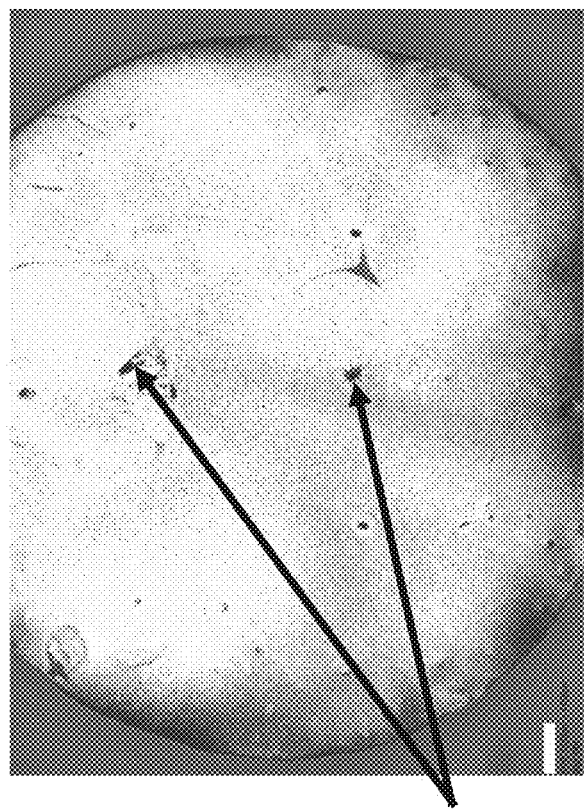
FIG. 1D is an image of the drop after evaporation.

FIG. 1C is in image of the middle stage of evaporation (approximately 50% of evaporation time) of the drop. It can be inferred from FIG. 1C that the monolayer growth at the drop surface continues throughout the evaporation process until the higher vapor pressure solvent has completely evaporated and all of the particles have reached the interface. FIG. 1D is an image of the drop after evaporation. It can be seen from FIG. 1D that during the final stages of the evaporation process, the contact line of the evaporating fluid de-pins, allowing for the assembled sheet of nanoparticles to collapse onto the substrate. These observations suggest a process qualitatively different from previously reported methods for producing uniform films from evaporating drops, which solely employ interparticle capillary interactions, particle-interface interactions, or fluid-particle interactions. Instead, this assembly process is a hybrid case wherein particle-fluid interactions to carry the particles to the boundary, followed by particle-interface interactions that assemble the particles into a sheet at the surface of the drop. The observed rigidity of the sheet is indicative of a solid-like nanocrystal. The sketch in FIG. 1C has the same meaning in FIG. 1A. The sketch in FIG. 1D has the same meaning but since the evaporation is complete, the flux of solvents is represented as near zero and there is no Marangoni flow.

In experiments leading to this disclosure, EGaInNP (In this disclosure, EGaInNP stands for Eutectic Gallium Indium Nano aprtciles} dispersions were prepared by an ultrasonication method described in literature. All samples were prepared in 3 dram bottles (Kimble Chase). Before ultrasonication the vials were thoroughly washed with Liquinox detergent (Alconox), followed by a rinse with distilled water, followed by a rinse with ethanol to remove surface impurities. Once clean, a nominal mass of 1 g of eutectic Gallium-Indium alloy (EGaIn) (Sigma-Aldrich) was added to the vial via syringe. Masses were measured using a Ohaus Pioneer balance with 0.1 mg resolution. This was followed by the addition of 120 µL (Labnet BioPette, 1000 µL size) of 100 mM solution of 3-mercapto-N-nonyl-propionamide (1ATC9, Sigma-Aldrich). An additional 3880 µL of pure ethanol was added to achieve a final thiol concentration of 3 mM and final liquid volume of 4 mL. Once the sample was prepared, the liquid metal was dispersed into the solvent using a Qsonica Q700 probe ultra-sonicator fitted with a 1/16 in microtip. The vial with EGaIn and solvent was contained in a water bath to prevent overheating and evaporation of the sample. The sample was sonicated for 1 h at an amplitude of 30%. After sonication, samples were either further processed via centrifugation or placed in a −35° C. freezer for later processing. Differential centrifugation was used to separate particles of various sizes. The process is as follows. Sonicated samples were distributed evenly into 1.5 mL polypropylene centrifuge tubes, lightly bathsonicated (Branson 1800) in isopropyl alcohol (Macron Fine Chemicals) for approximately 20 s, and placed in a refrigerator at approximately 10° C. for several minutes to allow the samples to reach below the melting point of the bulk alloy. The samples were then rinsed of any free thiol by centrifugation (RevSpin RS-200). Namely, the samples were spun at 10,000 rotations per minute (RPM) (5529 relative centrifugal force (RCF)) for 10 min. The resulting aliquots were discarded and the pellets were resuspended via light sonication in ethanol. This process was repeated three times to ensure there was no unbound thiol in the samples. Next, the resuspended pellets were spun at 2,000 rpm (220.5 RCF) for 10 min. The aliquots from this step were poured into centrifuge tubes to obtain smaller particles, whereas the pellets were resuspended via light sonication in fresh ethanol. This process was repeated three times. This procedure was further applied to the aliquots to obtain particles at 4,000, 6,000, and 8,000 rpm (884, 1990, and 3537.5, RCF, respectively) in series. Samples from each differential centrifugation condition were deposited on clean Si for scanning electron microscope (SEM)-based particles sizing. Ethanol/water mixtures were made by adding a known volume (Lagnet BioPette, 20 µL) of ethanol to a pellet of dried particles, followed by light bath sonication for resuspening, followed by the addition of the appropriate volume (Lagnet BioPette, 20 µL) of distilled water to reach the required mixture ratio (for this study an ethanol mass fraction of ≈28% was used).

The polydimethylsiloxane (PDMS, Sylgard 184, Dow Corning) substrate samples were prepared as follows. The polymer is provided as a two-part system consisting of a base and a curing agent. The two liquids are mixed in a 10:1 mass ratio. The two parts were mixed by hand and placed in THINKY ARE 310 orbital mixer for further mixing and degassing. Once mixed, the liquid polymer was cast onto 2 in.×3 in. borosilicate glass slides using a Specialty Coating Systems Spin-coat G3-8 spin coater at 200 rev·min$^{-1}$ for 60 s. Coated slides were cured in an incubator at 60° C. for at least 4 h. Upon curing, the polymer film was cut into 0.25 in squares, and cleaned by sonication in acetone, followed by rising with acetone, isopropyl alcohol, ethanol, and water. The rinsed samples were then dried with compressed air. PDMS squares were removed from the diced sample and placed on a clean glass carrier slides for plasma treatment. Slides were treated with oxygen plasma (Plasma Etch Venus 25 plasma etcher) for 5 min at 50 W with an oxygen flow rate of 10 CFM·min$^{-1}$. Treated surfaces were used within 24 h to maintain consistent drop wetting and contact line pinning behavior. The Si substrates employed for drop-depositing were prepared using a procedure described elsewhere. Once received, they were cleaned via bath sonication in acetone, isopropyl alcohol, then ethanol, for 5 min each, drying with air after each sonication treatment.

All drop evaporation experiments were conducted at room conditions with a measured temperature (Fluke 87 V with K-type thermocouple) of 23±2° C. and a measured relative humidity (Kele HS-2000D) of 21%35 2%. Typical experiments for conducting drop evaporation were conducted as follows. Sessile drops were formed by gently placing small volumes of colloidal dispersion (see previous Experimental Subsections) via pipette (Lagnet BioPette, 20 μL) onto stationary substrates located on a microscope stage (Zeta 20 with custom tilt attachment). The substrates employed for observing the evaporation process were plasma treated PDMS (see Preparation of Substrates). Upon deposition of drops, top and side views were filmed from the optical microscope with a screen capture software (Camtasia 8). Using an in-house MATLAB image analysis script, the geometry of the profiles were analyzed throughout the evaporation process until the profile became too small for the script to detect (between 4° and 9°, depending on initial drop size, objective, and focusing conditions). Films by the process of depositing drops and evaporating them were also made on Si substrates.

Samples for particle size characterization were prepared by depositing small volumes of each differential centrifugation condition via micropipette (Lagnet BioPette, 20 μL) onto clean Si substrates. SEM images of these samples were then obtained (Philips XL-40 FEI). All images were analyzed using previously reported procedure 17 (results from this process can be found in Figure S4). Topography measurements of the self-assembled films on PDMS substrates were obtained using a confocal microscope (LEXT 3000) with a 100× microscope objective. The PDMS squares were then mechanically peeled from the carrier glass slide and placed onto smaller glass slides for spectrophotometry measurements (PerkinElmer Lambda 950, light scan from 300 to 820 nm, with a resolution of 0.5 nm and a 5 s dwell time). Following topography and spectrophotometry measurements, the self-assembled films on PDMS were prepared for SEM (FEI Nova nanoSEM FESEM) imaging via platinum sputtering (Cressington 208 HR, 40 mA, 0.08 mbar for 60 s). Self-assembled films from the deposited drops were also placed on Si substrates using the same method as the drop evaporation experiments and imaged via SEM (FEI Quanta 2D FEG Dual-beam SEM).

Langmuir Trough Experiments were conducted to characterize the dependence of surface tension on the areal concentration of EGaInNPs The instrument used in this work is a Kibron microtrough with a pair of automated movable barriers, which compresses the nanoparticles that are spread on a water surface, and a surface pressure sensor, which controls the barriers. 30 Monolayers of EGaInNPs were prepared using a spreading ethanolic solution with a concentration of 50 mg·mL$^{-1}$. The sample was spread carefully using a positive displacement pipette at a rate of ≈0.6 μL·s$^{-1}$. After the solvent evaporated, the hydrophobic dodecanethiol (1ATC9)-stabilized EGaInNPs remained on the water surface, appearing as a shiny silver color (see Figure S3), and were then compressed by moving the barriers at a speed of 10 mm·min-1. The surface pressure isotherm was recorded throughout the compression. The temperature of the double deionized water (18 MΩ·cm in the trough) was about 20° C.

Figure 2A:
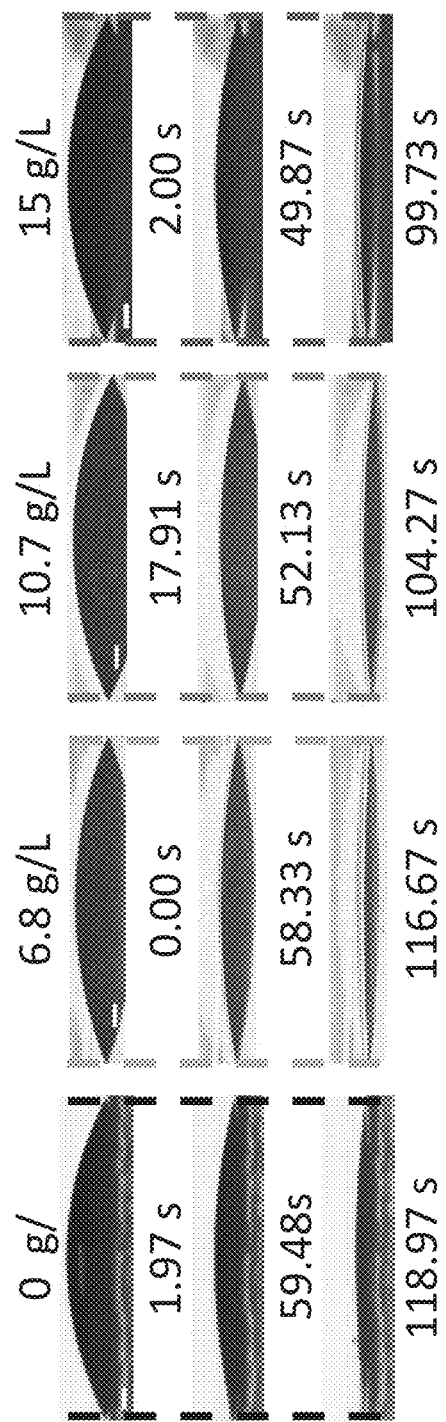
FIG. 2A shows profile images of sessile drops with various particle concentrations at different times during the evaporation process.
Figure 2B:
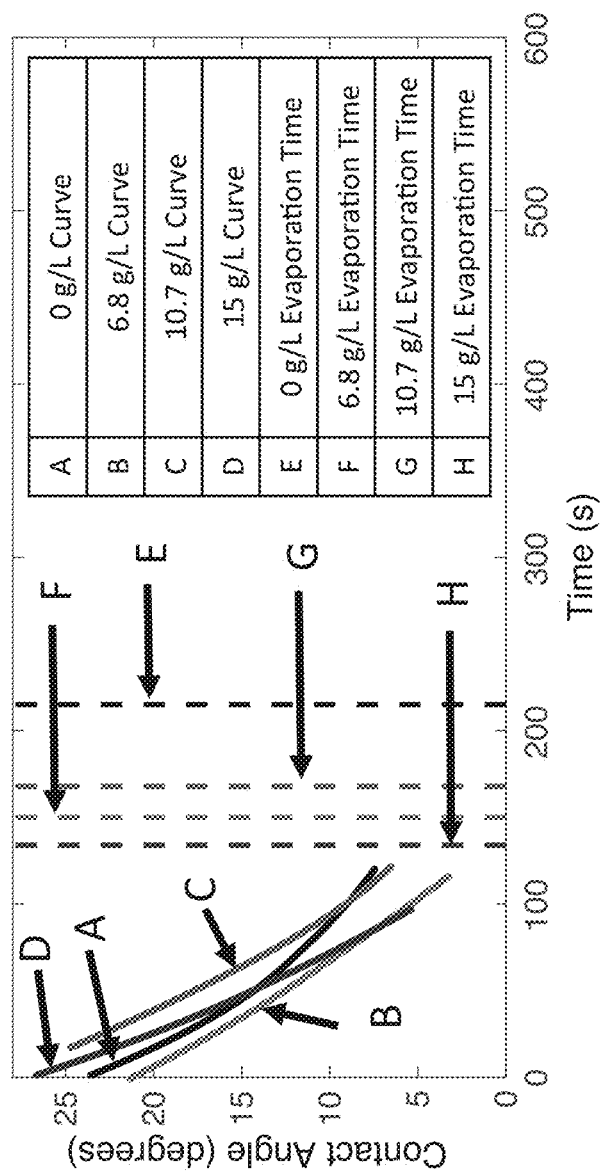
FIGS. 2B and 2C are plots of contact angle and volume of the drop against evaporation time respectively.
Figure 2C:
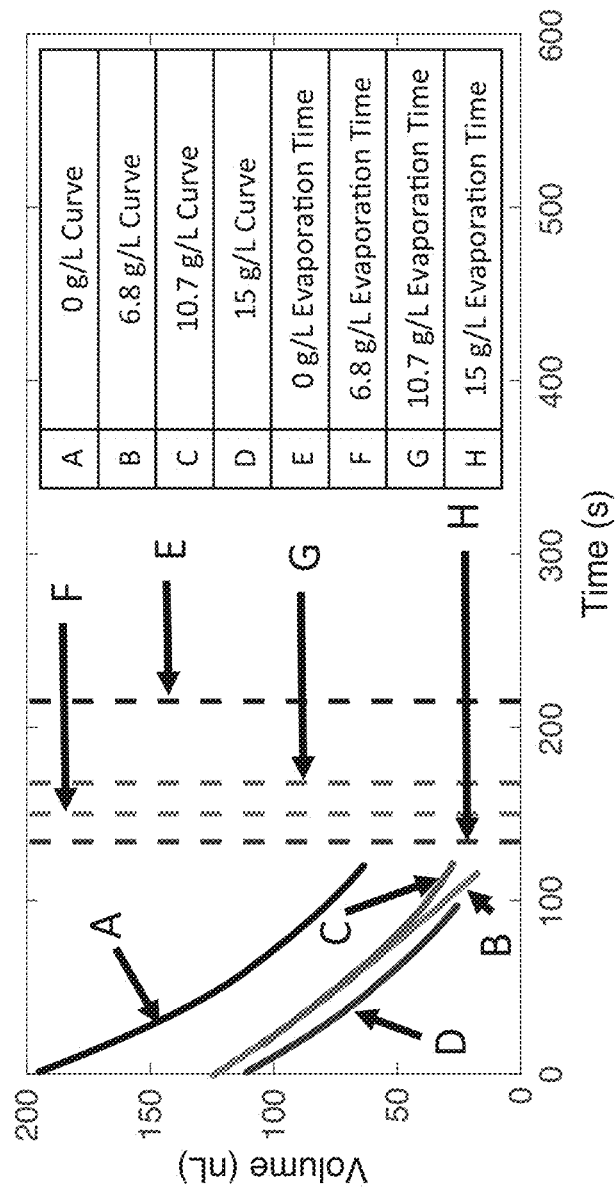
Figure 2D:
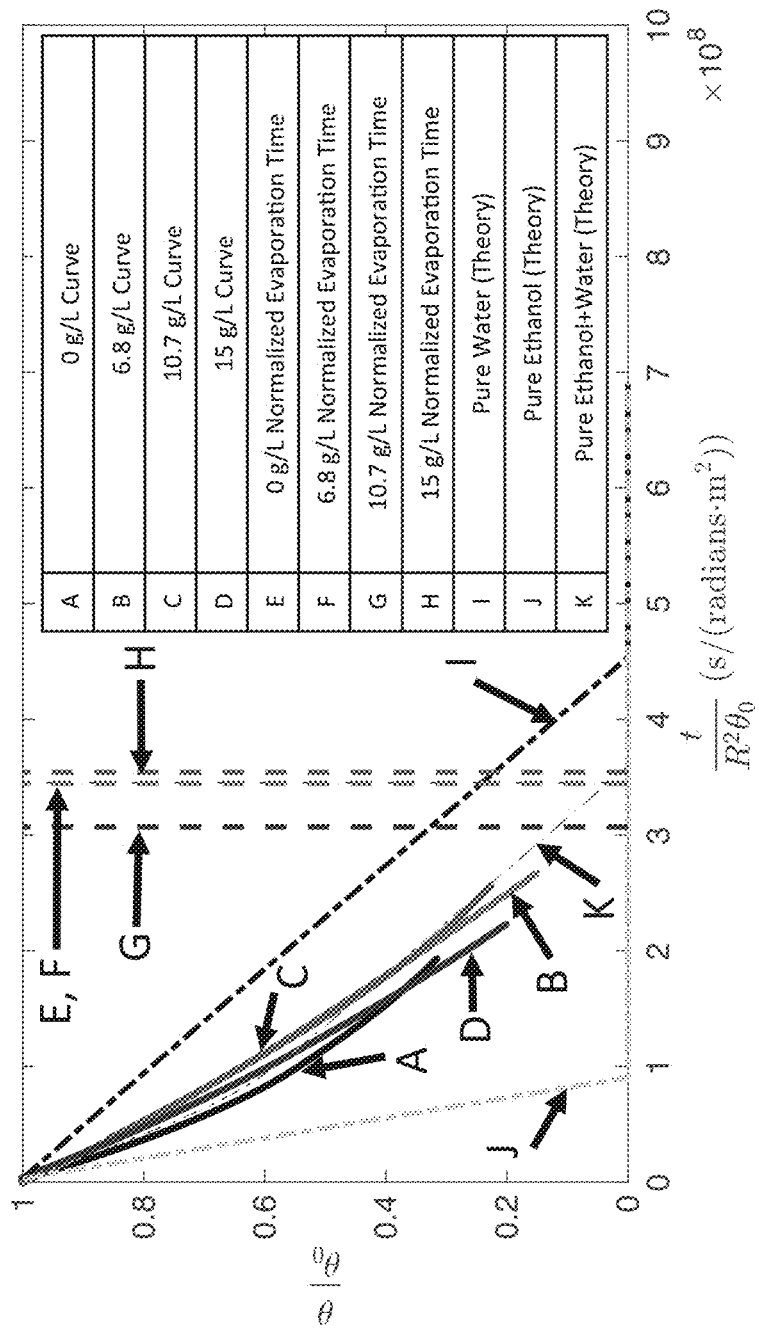
FIGS. 2D and 2E are plots of dimensionless contact angle dimensionless volume against time normalized by drop size and initial contact angle.
Figure 2E:
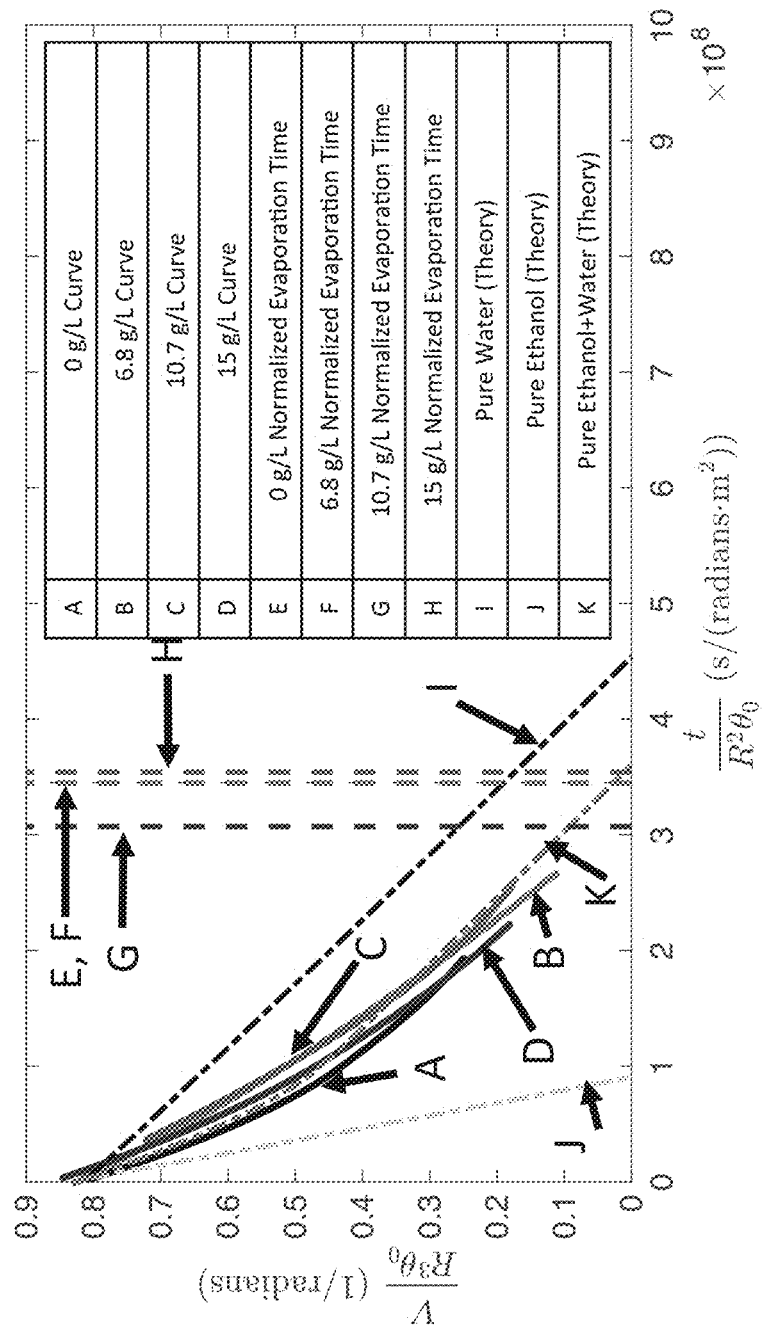

Evaporation studies reveal two mechanisms of this self-assembly process, as summarized below. FIG. 2A shows profile images of sessile drops with various particle concentrations at different times (shown in seconds) during the evaporation process. Referring to FIG. 2A, four sets of images are shown, one for each concentration as labeled. The concentration shown are in grams of EGaInNP per liter of dispersion. In FIG. 2A, vertical dashed lines are used to highlight that the drops remain pinned (i.e., constant contact radius) throughout this process. Concentrations are given in grams/liter (g/L). Scale bars are 150 μm in length. Kinetics of drop geometry during evaporation are illustrated through several plots shown in FIGS. 2B through 2E. FIGS. 2B through 2C are plots of contact angle and volume of the drop against evaporation time respectively. FIGS. 2D and FIG. 2E are plots of dimensionless contact angle dimensionless volume against time normalized by drop size and initial contact angle. In FIGS. 2B through 2E vertically oriented dashed lines mark the total evaporation time for each experiment. In FIGS. 2D and 2E, the curves labeled "theory" were generated based on observed initial conditions for the 0 g/L drop experiment. The particles in the dispersions studied on which FIGS. 2A through 2E are based had a mean size of 268 nm with a standard deviation of 51 nm.

It can be seen from FIGS. 2B through 2E that the evaporation dynamics initially favor that of pure ethanol despite the fact that the initial concentration of water is much larger (initial mole fractions of water and ethanol within the drop are $x_w \approx 0.87$ and $x_e \approx 0.13$, respectively), which supports previous experimental observations that the drop rapidly segregates during evaporation into an outer ethanol shell and a water enriched core. The evaporation process can be modeled as quasi-steady state, where liquid vapor equilibrium applies. As a result, the vapor mole fraction of ethanol just above the drop surface, $y_e$, is significantly larger than the liquid mole fraction of ethanol within the drop (e.g. initially for this study $x_e \approx 0.13$ and $y_e \approx 0.49$). To maintain this condition, an excess of ethanol must be present at the interface. Moreover, the larger evaporation rate of ethanol during this process amplifies the transport of the ethanol to the surface. Because it is known that the thiol-capped nanoparticles form stable colloidal suspensions in ethanol and are also hydrophobic, they migrate to the drop surface via the evaporating ethanol due to fluid-particle interactions, completing the first part of the assembly process. Once at the interface between the water enriched core and the ethanol shell, it is expected that the nanoparticles assemble due to particle-interface interactions, thereby concluding the second phase of the hybrid self-assembly process.

The effects of particle concentration on the evaporation process were also examined in studies leading to this disclosure. It should be noted that nanoparticle concentrations here are reported per volume of total solution). FIG. 2A shows that the drops remained pinned throughout most of the evaporation process, regardless of particle loading. FIG. 2B shows similar initial contact angles among all concentrations, indicating that the wetting behavior is dominated by the interaction between the solvent mixture and the substrate. FIGS. 2B and 2C show good agreement between the predictions of dual-solvent evaporation models developed in this study. Normalizing the data from FIGS. 2B and 2C to account for differences in drop size and shape enables comparisons between the model and drops of various particle loadings. These normalization results are shown in FIGS. 2D and 2E. After accounting for differences in drop size and shape, the dynamics appear to behave in accordance with that predicted from a mixture evaporation theory, indicating that particle concentration has little effect on the evolution of the drop profile during evaporation throughout a majority of the drop lifetime. On the other hand, subtle differences do appear toward the end of evaporation, as evidenced by the slight discrepancies in normalized total evaporation times. For low particle concentrations (≤6.8 g·L$^{-1}$ or ≤1.08·10$^{14}$ particles·L$^{-1}$) there is no distinguishable difference. However, a medium concentration (10.7 g·L$^{-1}$ or $1.70 \cdot 10^{14}$ particles·L$^{-1}$) exhibits an extended normalized droplet lifetime, indicating that the concentration of the non-volatile nanoparticles is large enough to change the effective vapor pressure of the drop. Further increasing the concentration (15.0 g·L$^{-1}$ or $2.38 \cdot 10^{14}$ particles·L$^{-1}$) shows a shorter normalized drop lifetime compared to the nanoparticle-free case, indicating a trade-off between effective vapor pressure lowering and the reduced amount of volatile material initially present in the drop. In other words, at high nanoparticle concentrations, the relative amount of solvent initially present in the droplet is small enough to offset the reduced effective vapor pressure of the drop, resulting in a shorter normalized droplet lifetime.

Figure 3A:
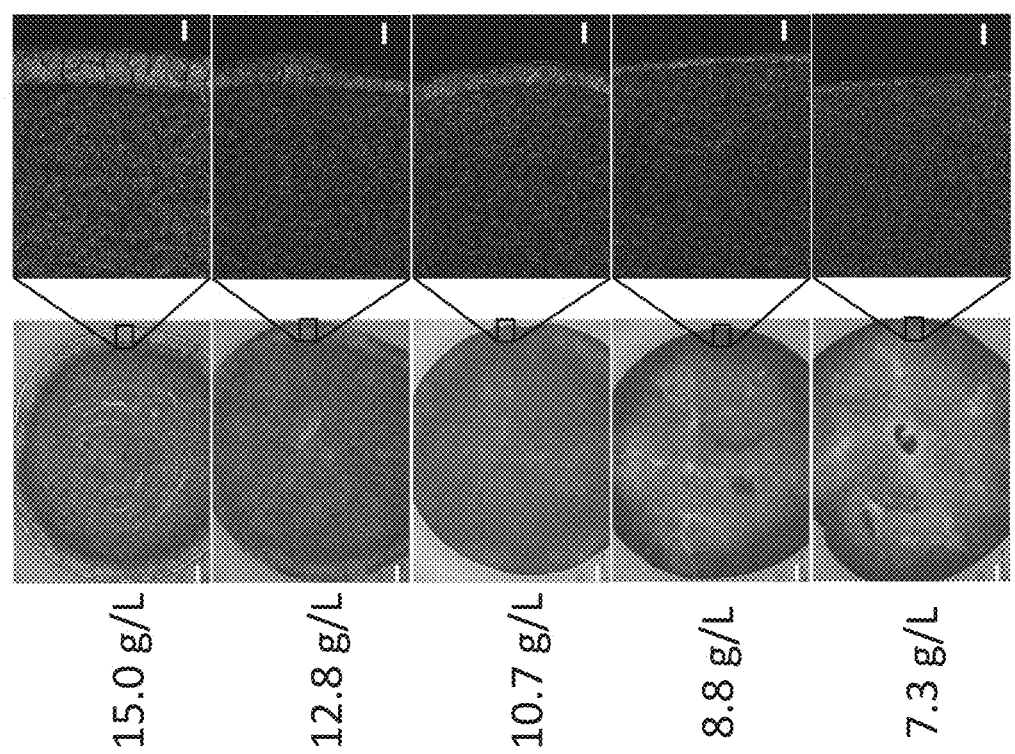
FIGS. 3A and 3B summarizes the influence of initial particle concentration on the final morphology of the film.
Figure 3B:
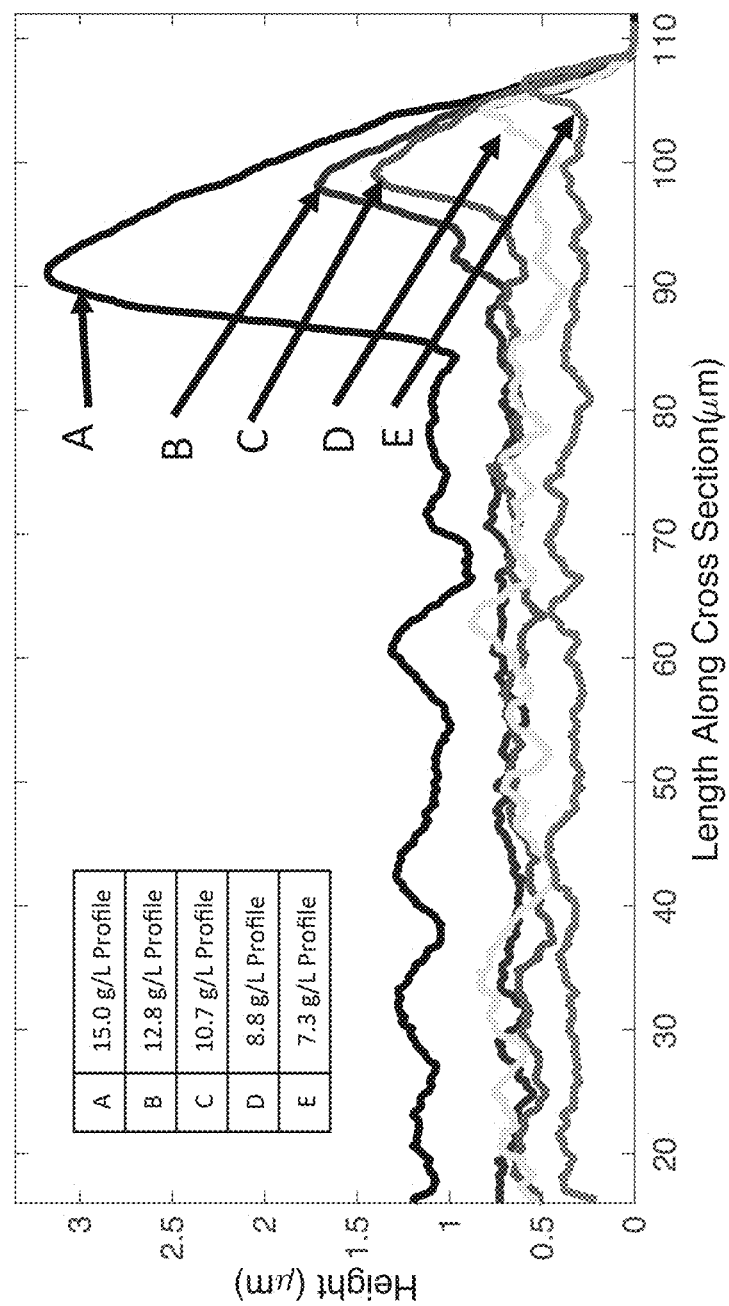
Figure 4A:
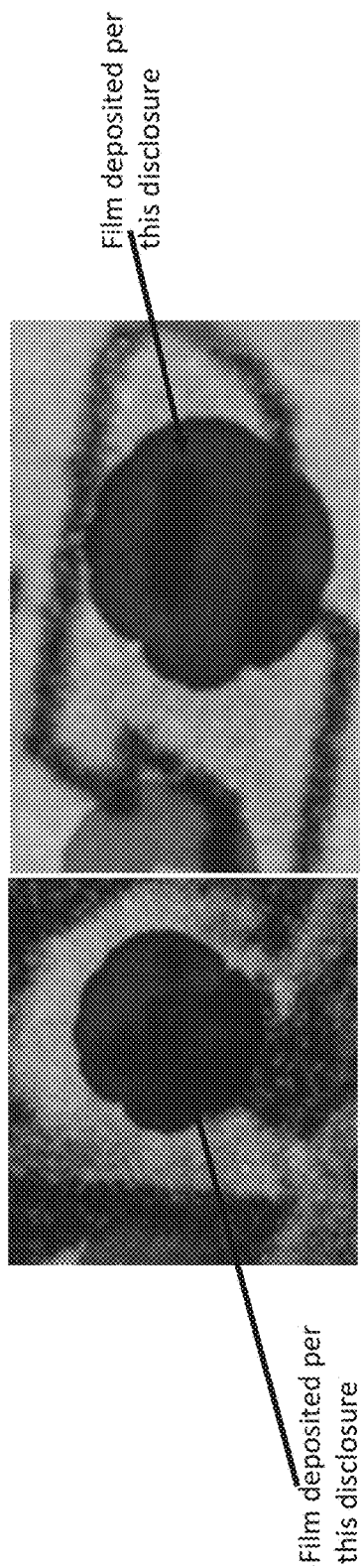
FIGS. 4A and 4B are qualitative examples demonstrating use of films of this disclosure as thin film devices.
Figure 4B:
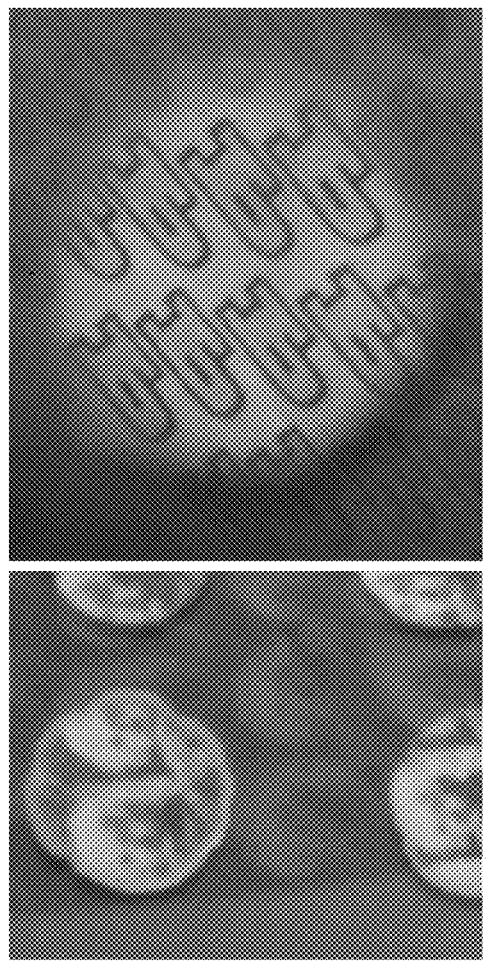
Figure 4C:
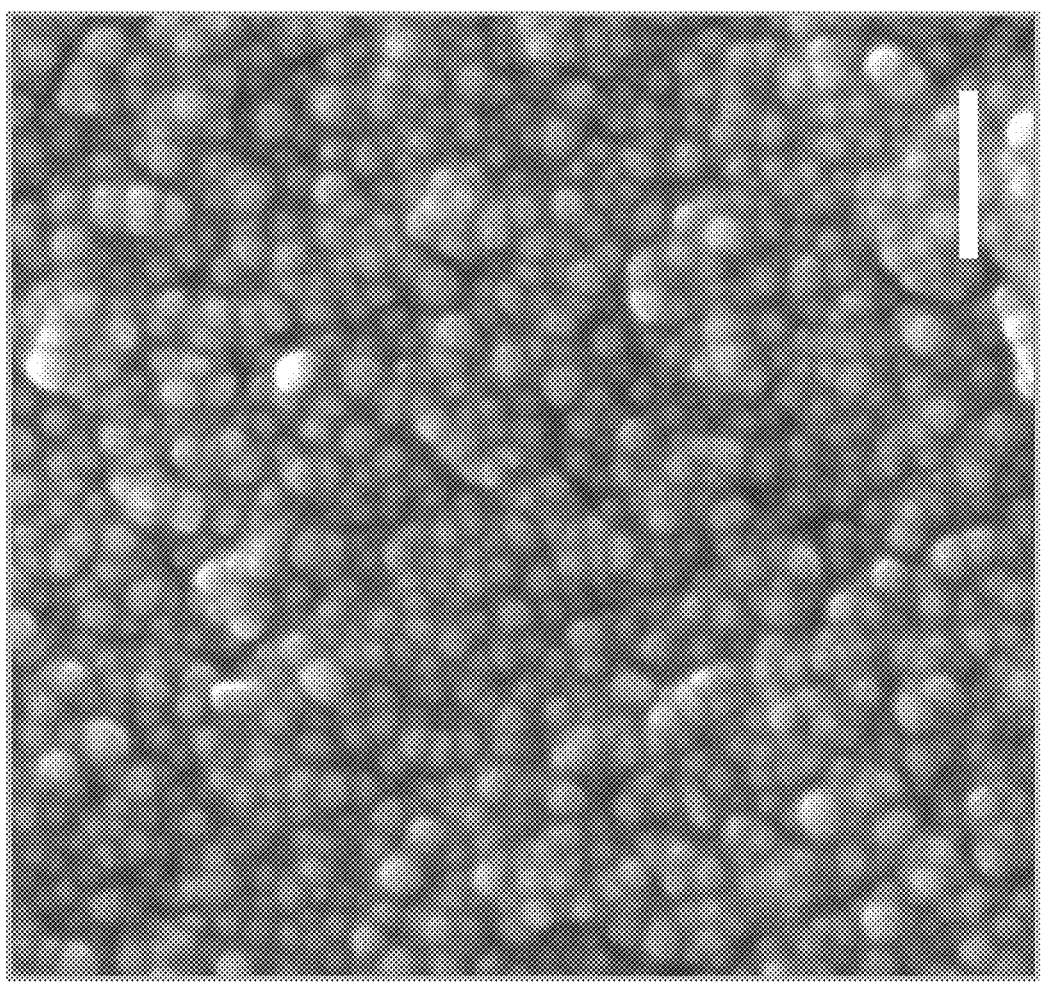
FIG. 4C is a representative SEM image of film morphology for the 84±18 nm samples used in FIGS. 4A and 4B.
Figure 4D:
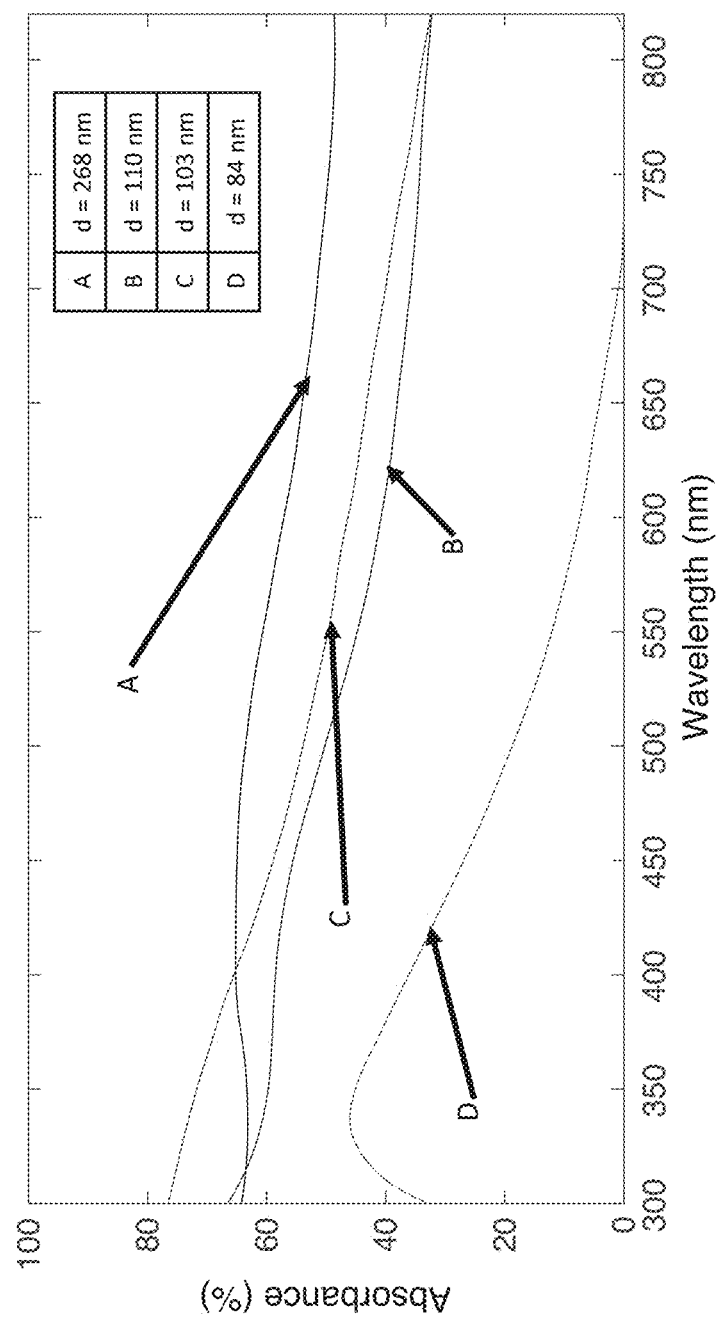
FIGS. 4D through 4G show the measured optical results (for various assembled films of various particle sizes d in nm, namely absorbance, transmittance, reflectance and specular reflectance normalized by total reflectance respectively.
Figure 4E:
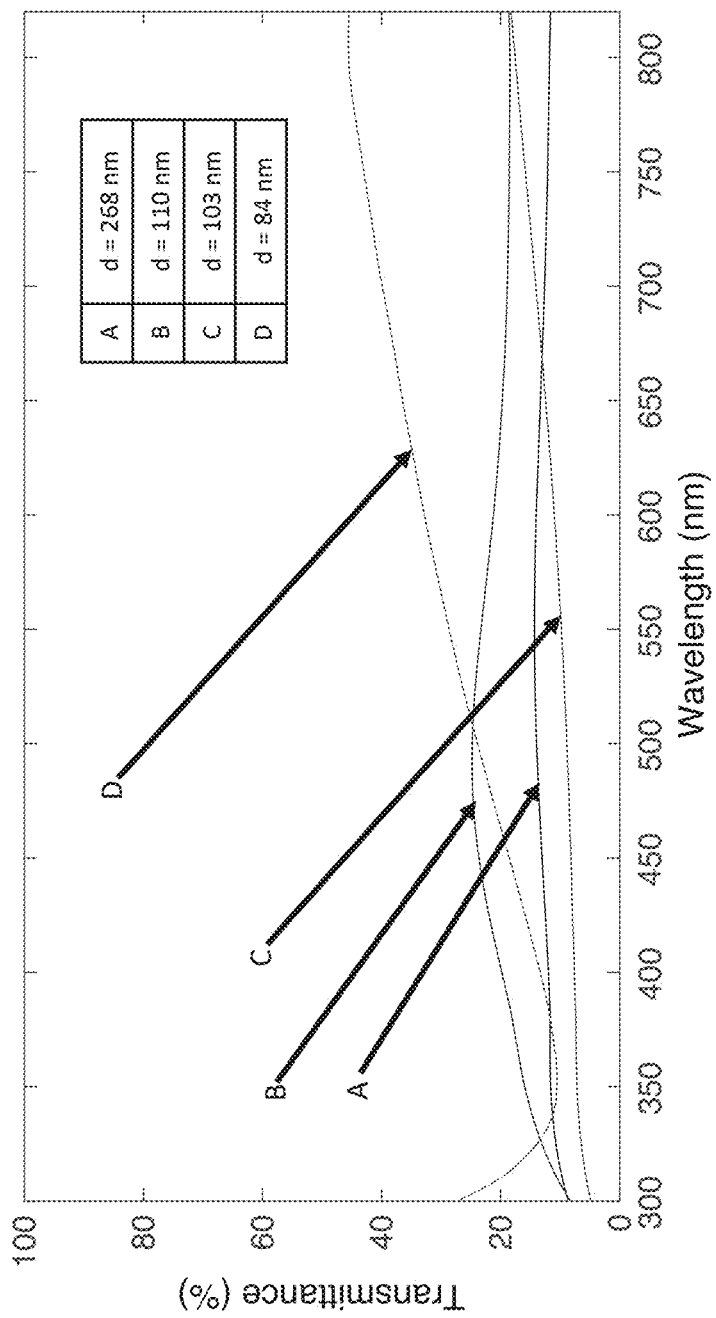
Figure 4F:
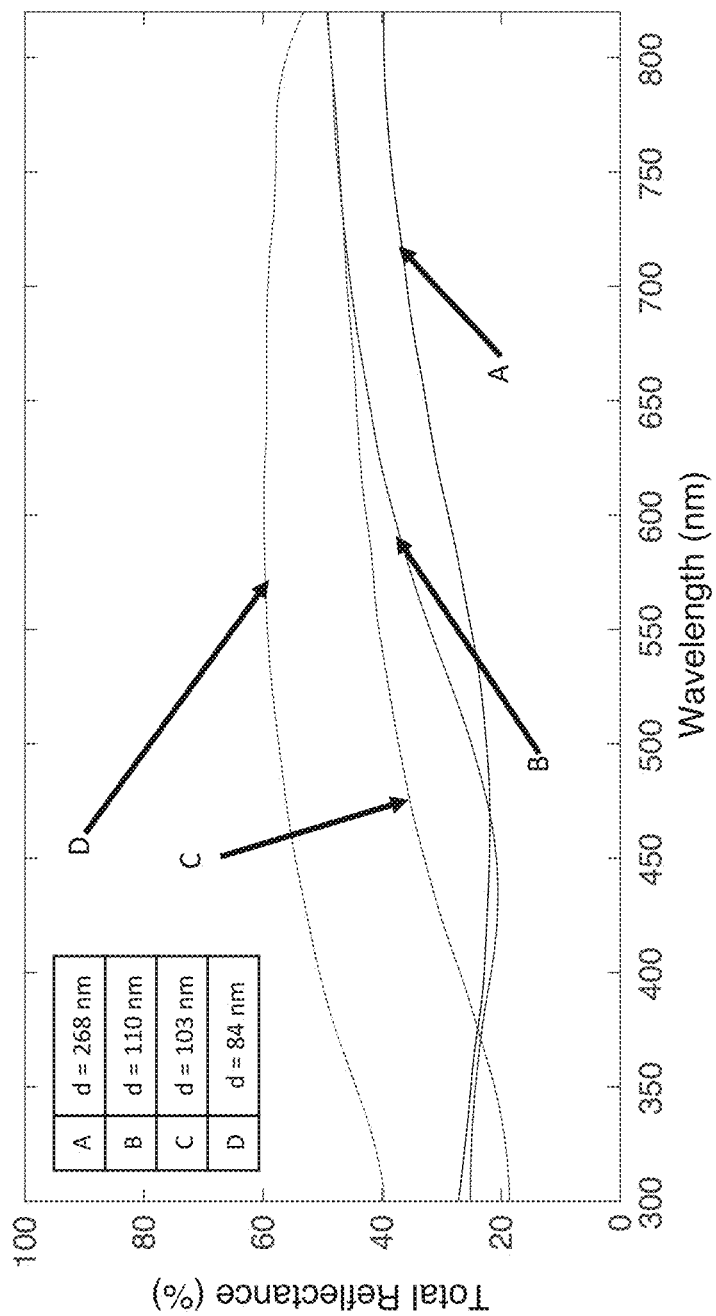
Figure 4G:
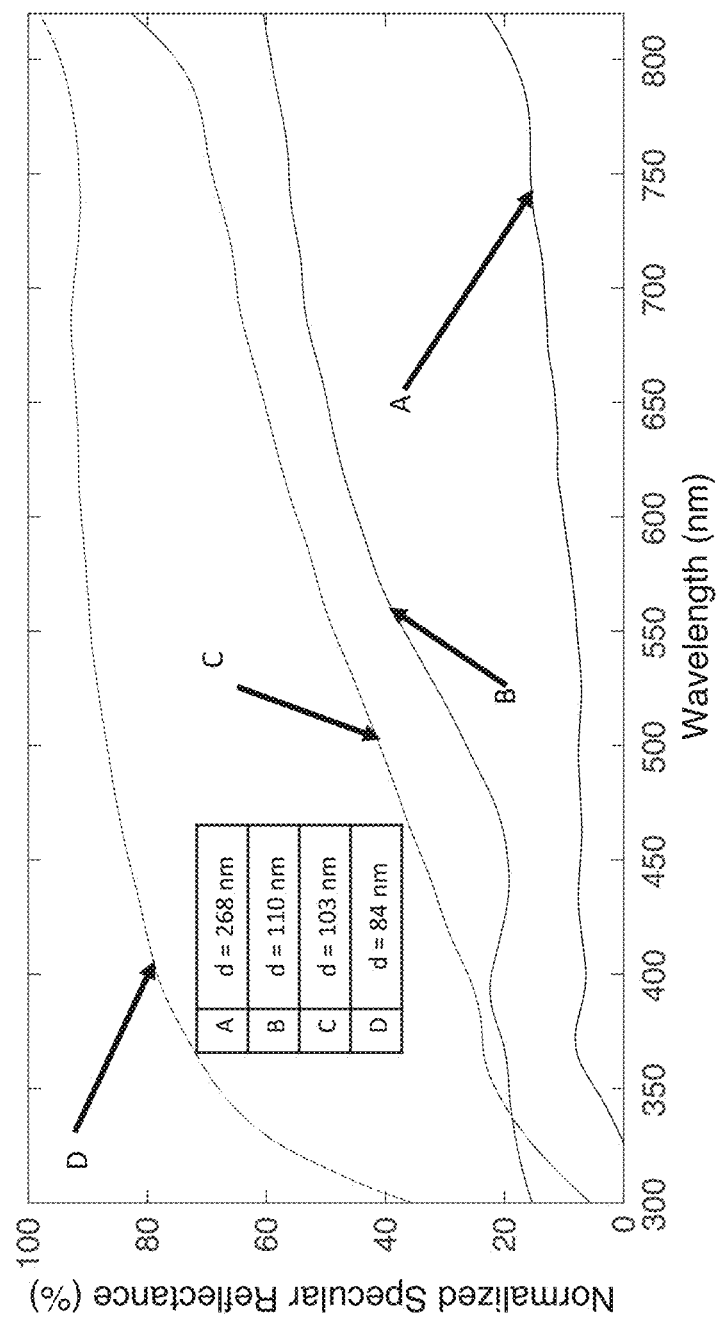

FIGS. 3A and 3B summarizes the influence of initial particle concentration on the final morphology of the film. FIG. 3A shows optical micrographs (left) of films left behind (scale bars are 150 µm in length) with corresponding detail confocal intensity micrographs (right) of the film edge (scale bars are 10 µm in length). Films with high initial concentrations (15.0 g·L$^{-1}$ or $2.38 \cdot 10^{14}$ particles$^{-1}$) exhibit a dense accumulation of particles at the boundary (i.e., a large coffee ring), with a uniform film at the interior of the drop. Note the presence of cracks in the coffee ring of the high concentration film, indicative of high particle loading in dry colloidal deposits. FIG. 3B shows profiles of the films corresponding to the concentrations shown in FIG. 3A. It can be seen form FIGS. 3A and 3B, that reducing the initial concentration results in thinner thickness of the uniform interior of the film as well as a size decrease of the coffee ring, with a complete elimination corresponding to concentrations <8.8 g·L$^{-1}$ ($1.40 \cdot 10^{14}$ particles$^{-1}$). Small voids in the film at the smallest initial concentration (7.3 g·L$^{-1}$ or $1.16 \cdot 10^{14}$ particles$^{-1}$) suggest that the optimal initial concentration (i.e., the concentration that will result in a uniform monolayer film) lies between 7.3 and 8.8 g·L$^{-1}$. This range can be transformed to the number of particles in a drop (n) under the spherical cap approximation via $n = 2cR^3 (1+ \cos(\theta_0))2 (2+ \cos(\theta_0))/d^3 \rho \sin 3 (\theta_0)$; where c is the initial mass concentration of particles, R is the areal contact radius of the deposit, $\theta_0$ is the contact angle of the drop at the onset of evaporation, d is the particle size, and $\rho$ is the mass density of the particle. Substituting in appropriate values for these experiments: 7.3 g·L$^{-1}$<c<8.8 g·L$^{-1}$, R≈1.2 mm, $\theta_0 \approx 25°$, $\rho = 6250$ kg·m$^{-3}$, and d=268 nm (the particle size used for the study in FIG. 3), results in an optimal number of particles in a drop to be between $7.1 \times 10^7$ and $8.5 \times 10^7$. Theoretically, a closely packed monolayer of particles from a deposited drop requires $n_{optimal} = 4pR^2d^{-2}$, where p≈0.907 is the hexagonal packing factor for circles in a plane. 26 We assume hexagonal packing because the time scale packing because the time scale for the particles to assemble by particle diffusion is found to be smaller than the time scale for the particles to reach the drop surface due to evaporation indicating that the likely arrangement of the particles at the surface is hexagonal packing. Therefore, the theoretically estimated number of particles per drop to produce uniform monolayer films is $n_{optimal} = 7.3 \times 10^7$ (corresponding to an optimal concentration of $c_{optimal} = 7.5$ g·L$^{-1}$), which indeed falls within our observed range. This demonstrates a process for determining appropriate particle concentrations for uniform monolayer films in multiple-solvent or dual-solvent formulations.

The results described above also indicate that exceeding the appropriate concentration range will result in the formation of a coffee ring at the contact line and an increase in thickness over the uniform interior of the film, which is expected due to the nature of monolayer growth during evaporation. Once a monolayer is achieved during evaporation, any particles remaining within the drop will begin to form multilayer structures as they move to the surface and collide with particles within the formed monolayer. The likelihood for collisions is largest at the edge of the drop because this is where the radial velocity is highest, resulting in the presence of coffee ring films for $c > c_{optimal}$, as shown in FIG. 3A. Note the appearance of gray spots in the optical micrographs of FIG. 3A for $c > c_{optimal}$. These gray spots in the optical microscope images of the films are a result of differences in light scattering, indicating differences in local film thickness (lower local thicknesses in the gray areas). This is believed to be a result of multiple layers being formed throughout areas of surface while the first layer is still being formed in other areas.

Experiments were conducted to demonstrate application of this self-assembly process to the fabrication of high performance drop-on-demand thin film optical devices. FIGS. 4A and 4B are qualitative examples demonstrating use of films of this disclosure as thin film devices. FIG. 4A illustrates the application of the films of this disclosure as filters, where the film reduces the amount of light transmitted through a close-up image of Einstein (left part of FIG. 4A) and a close-up the letter "P" (right part of FIG. 4A). FIG. 4B illustrates they application of the films of this disclosure as mirrors, where the film reflects light incident on (left part of FIG. 4B) an image of an array of "Einsteins" and (right part of FIG. 4B) an image of an array of letters, "P's". Films in both these instances (filter and mirror) are approximately 2 mm in diameter. FIG. 4C is a representative SEM image of film morphology for the 84±18 nm samples used in FIGS. 4A and 4B. The scale bar in FIG. 4C represents 500 nm in length. The representative scanning electron micrograph in FIG. 4C reveals that these films are uniform and densely packed. FIGS. 4D through 4G show the measured optical results (for various assembled films of various particle sizes d in nm, namely absorbance, transmittance, reflectance and specular reflectance normalized by total reflectance respectively. The larger particles will produce thicker samples, resulting in an increased absorbance, as seen in FIG. 4D. This gives rise to the reverse effect for the transmittance as seen in FIG. 4E. The absorbance and transmittance spectra also flatten with increased particle size. This may be due to the increased size heterogeneity with respect to particle size, allowing for cancellation of resonance peaks associated with different sized particles within the sample. Most notable of this effect is the flat transmission response (13%±2%) associated with the largest particle (d=268 nm) monolayer films over the entire sampled range (300 nm-820 nm), which demonstrates an application of these films as a broadband neutral density filter. As shown in FIGS. 4F and 4G, the samples are also inherently reflective given their metallic composition. The decrease in particle size gives rise to smoother films. As the films become smoother, their total and specular reflectance increases, resulting in the trend seen in these figures. As shown in FIG. 4G, FIG. 4*g*, the high specular reflectance response (>80%) associated with the small particle (d=84 nm) films shows promise for use as a mirror, especially for wavelengths in the visible-near infrared range.

Experiments leading to this disclosure have revealed that uniform films from evaporating drops from dual-solvent dispersions are created by a hybrid of two self-assembly mechanisms: 1) Fluid-particle interactions, where the nanoparticles are carried to the drop surface by the higher vapor pressure solvent, followed by 2) Particle-interface interactions once the particles reach the interface of the phase-segregated drop. As observed, this assembly process occurs at the surface of the drop, indicating independence of this mechanism with respect to substrate. The dual-solvent evaporation model developed as part of this work accurately describes the drop profile kinetics and could be used for future design of dual-solvent based functional inks. The agreement of the size and shape normalized data and model show scalability of this process. Results of experiments leading to this disclosure also show a simple means for designing particle concentrations to produce uniform monolayers. Moreover, the application of dual-solvent formulation to high performance drop-on-demand thin film devices such as mirrors and broad band neutral density filters has been demonstrated. Adaptation of the methods of this disclosure to high throughput drop deposition methods (e.g. roll-to-roll inkjet printing) can prove to be viable means to fabricate thin film devices.

Thus in this disclosure a method has been demonstrated for producing strikingly uniform films from evaporating drops contained in a dual-solvent dispersion. This assembly process leverages both particle-fluid interactions to carry the particles to the drop surface and particle-interface interactions to assemble the particles into a uniform film. The process can be employed to produce thin film devices such as flexible broadband neutral density filters and semi-transparent mirrors. Experimental results indicate that this assembly process is free of particle-substrate interactions, which indicates that the results should be transferable across a multitude of material/substrate systems. Further, the concepts and approaches can be extended to multi-solvent dispersions as explainer earlier.

Based on the above studies and discussion, it is an objective of this disclosure to describe a method of depositing uniform films of particles with monolayer capability wherein the method includes a drop evaporation process resulting in a film comprising a monolayer.

Further, it is an objective of this disclosure to describe a method of producing a film comprising particles. The method includes the steps of providing particles with a coating on their outer surface such that the particles are substantially non-dispersible, substantially non-soluble and substantially non-suspendable in a first liquid, but are substantially dispersible and/or substantially soluble or substantially suspendable in a second liquid. Further, the first liquid and second liquid are miscible and the evaporation rate of the second liquid is greater than the evaporation rate of the first liquid. The particles are dispersed or dissolved or suspended as the case may be into the second liquid. The resulting mixture is further mixed with the first liquid to form a process mixture. The process mixture is then deposited onto a substrate forming a deposit, and the first liquid and second liquid are evaporated from the deposit resulting in a film comprising the particles on the substrate. In one embodiment of the above mentioned method, the vapor pressure of the second liquid is greater than the vapor pressure of the first liquid. In another embodiment of the method, diffusion coefficient between the second liquid and ambient atmosphere is greater than diffusion coefficient between the first liquid and the ambient atmosphere.

In the above method. Many choices exist for the first liquid. In one embodiment, the first liquid is water and the second liquid is an organic liquid, which, in some cases, can be an organic solvent. In one embodiment of the method, the particles have a coating on their outer surfaces. In one embodiment, the particles are made of a metal and a coating on the outer surface of the particles comprises sulfur-containing molecules. In a preferred embodiment the sulfur-containing molecules are molecules of a thiol. A non-limiting example of a thiol is 3-mercapto-N-nonylpropionamide (trade name 1ATC9 from Sigma-Aldrich). Alternatively, the sulfur-containing molecules can be molecules of an ionic liquid. A non-limiting example of such an ionic liquid is the ionic liquid is Methyltrioctylammonium thiosalicylate. It should be recognized that the coating can contain both sulfur-containing molecules and non-sulfur containing molecules.

In a preferred embodiment of the above method, the first solvent is water and the second solvent is ethanol. The particles employed in this preferred embodiment are thiol-coated eutectic Gallium-Indium (Ga—In) particles (in this case the thiol employed is 3-mercapto-N-nonylpropionamide). The thiol coating makes the particles hydrophobic and hence they are substantially non-soluble, substantially non-dispersible and substantially non-suspendable in the first solvent, namely water in this preferred embodiment. The second solvent in this preferred embodiment is ethanol and the thiol coated eutectic Ga—In particles are soluble and dispersible in ethanol. Further ethanol has a higher vapor pressure than water. This dispersion can be deposited on a substrate, which in a preferred embodiment is polydimethylsiloxane (PDMS). As described above in the experiments and analysis of the experimental results, evaporation of the solvents leads to a film of the particles. In a preferred embodiment, the particles formed comprises a monolayer. In the method described above the resulting films are uniform i.e the film has a surface roughness in the same order of magnitude as the particle size of the particles. In one embodiment of the method described above the particles are made of a GA—In alloy, and further in a preferred embodiment, the Ga—In alloy has eutectic composition. In one embodiment of the method described above, the particles have a size range of 1 nm to 2000 nm, with a preferred range being 100 nm to 250 nm. It should be recognized that in certain instances the uniformity of the film is found in a large segment of the film, but sometimes not necessarily at the edges of the film. The edges can have higher thickness due to the evaporation rates, concentrations of the particles in the dispersions etc. as described above. It should be also be noted that while in most cases evaporation is allowed to occur under the ambient conditions, it is possible to control temperature, humidity and pressure to optimize the evaporation rate to obtain desired rate of evaporation.

In the method described above, many techniques can be used to deposit the process mixture onto a substrate. These techniques include, but not limited to drop casting, spin coating, doctor blading, aerosol deposition (a process by which particles in an aerosol collect or deposit themselves on solid surfaces), slot die process (known to those skilled in the art of depositing coatings and films), microgravure deposition techniques (discussed in the literature), direct writing, and inkjet printing.

In the methods describe above, several substrate choices exist. Examples that can be used include but not limited to polydimethylsiloxane (PDMS) and silicon.

It should be noted that in a variation of the method, the particles include a first type of particles, and a second type of particles, wherein the first type of particles are capable of dissolving and/or dispersing in the first liquid and the second type of particles are capable of dissolving or dispersing in the second liquid. In this case, the process mixture comprises two liquids and two types of particles and the film formed has one layer substantially made of the first type of particles and a second layer substantially made of the second type of particles. In one embodiment of this method with two types of particles, the first type of particles are capable of dissolving and/or dispersing in the first liquid and the first liquid is phobic to the second type of particles; and further, the second type of particles are capable of dissolving and/or dispersing in the second liquid and the second liquid is phobic to the first type of particles. In this instance, one expects formation of two substantially distinct layers, when the vapor pressures of the two liquids are significantly different. It should be noted that if both the two types of particles are substantially soluble and dispersible in both the liquids, the resulting film from the method of this disclosure will be a particulate film wherein both types of particles may be intermixed depending on vapor pressures of the two liquids and the concentrations of each type of particles in the dispersion.

It is possible to modify the above methods to create more than two layers with more than two different types of particles made of materials. For example we can use three liquids, liquids 1, 2 and 3, such that material 1 dissolves or is dispersible in liquid 2, which evaporates faster than liquid 1, material 2 dissolves in solvent 3, which evaporates faster than liquid 2. The result is a layered structure with the bottom layer being substantially composed of material 1, the next layer substantially composed of material 2, and a third layer being essentially composed of material 3. It should be noted that this approach can be extended to more than three materials and three liquids. In this method it is understood that the particles, dissolving in one solvent are not soluble or dispersible or suspendable in the other solvents. As explained above, for the case of two liquids and two type of particles, it should be recognized that in cases where 3 or more types of particles.

It is an objective of this disclosure to describe films made by the above method, namely particulate films of uniform thickness comprising one or more layers, each layer substantially made of a particular type of particles. The films of this disclosure comprise particles and possess edges that are thicker than the interior, approximately two to ten times thicker than in the interior depending on the number of layers of particles in the film at these edge locations due to the process of the film formations as described earlier. Another embodiment of this disclosure is a particulate film comprising one or more layers of particles, each layer substantially made of particles of chemical composition different from the chemical composition of particles of other layers, wherein the film having a greater thickness at its edge than in an interior region of the film. In the above cases the edge is to be understood to mean typically about 10-20 micrometers from where there is no particles are formed on the substrate and this higher thickness is found in that region meaning that in regions closest to the area where one observes no particles are formed, the thickness is similar or less than in the interior of the film.

It should be noted that the chemical composition of the particles is to be chosen consistent with the application in mind. For example, as described in this disclosure, particulate films whose particles have the chemical composition as thiol-coated eutectic Ga—In alloy were shown to be suitable for certain optical devices, such as, but not limited to optical filters and semi-transparent mirrors. Thus the chemical compositions of the particles has to be chosen keeping in mind the application of a device that would exploit the physical, optical, electronic, biological or other properties of the film for devices such as sensors.

It should be noted that while the above description describes use of metallic particles, the method and the films of this disclosure are not limited to metallic particles. Polymer particles can be used in the method resulting in polymer films. It should also be noted that biological materials can be used in the method resulting in biological films.

It is a further objective of this disclosure to disclose several devices and applications utilizing the films and methods of this disclosures. Non-limiting example of such devices and applications include optoelectronics devices, photovoltaic devices, and electronic devices.

It is an objective of this disclosure to describe an optical device comprising a particulate film containing at least one layer of particles, wherein the at least one layer is substantially made of particles of a chemical composition and has uniform thickness. In one embodiment of the optical device the chemical composition is thiol-coated eutectic gallium-indium alloy. Particulate films wherein the particles are of thiol-coated eutectic gallium-indium alloy particles have been demonstrated in this disclosure to be suitable as an optical filter wherein the film reduces the amount of light transmitted. Another non-limiting example of a device comprising a particulate film wherein the particles are thiol-coated eutectic gallium-indium alloy particles is a semi-transparent or semi-opaque mirror as described and illustrated above in this detailed description. In some preferred embodiments of the above described filter and mirror, the particulate film is a monolayer.

While the present disclosure has been described with reference to certain embodiments, it will be apparent to those of ordinary skill in the art that other embodiments and implementations are possible that are within the scope of the present disclosure without departing from the spirit and scope of the present disclosure. It is therefore intended that the foregoing detailed description be regarded as illustrative rather than limiting. Thus this disclosure is limited only by the following claims.

The invention claimed is:

1. A particulate film comprising at least one layer of particles, wherein the at least one layer is substantially made of particles of thiol-coated eutectic gallium-indium alloy and has uniform thickness.

2. The particulate film of claim 1, wherein the average film thickness is in the range of 1 nm to 2000 nm.

* * * * *